United States Patent
Lee et al.

(10) Patent No.: US 11,609,477 B2
(45) Date of Patent: Mar. 21, 2023

(54) LIQUID CRYSTAL BASED OPTICAL DEFLECTOR AND OPTICAL SCANNER USING THE SAME

(71) Applicants: Hyundai Motor Company, Seoul (KR); Kia Motors Corporation, Seoul (KR); Inha University Research and Business Foundation, Incheon (KR)

(72) Inventors: Yong Sung Lee, Gyeonggi-do (KR); Kyong Hon Kim, Incheon (KR); Yu Deuk Kim, Incheon (KR); Ju Seong Bang, Incheon (KR)

(73) Assignees: Hyundai Motor Company, Seoul (KR); Kia Motors Corporation, Seoul (KR); Inha University Research and Business Foundation, Incheon (KR)

( * ) Notice: Subject to any disclaimer, the term of this patent is extended or adjusted under 35 U.S.C. 154(b) by 501 days.

(21) Appl. No.: 16/814,349

(22) Filed: Mar. 10, 2020

(65) Prior Publication Data
US 2021/0116779 A1 Apr. 22, 2021

(30) Foreign Application Priority Data
Oct. 18, 2019 (KR) .......................... 10-2019-0130198

(51) Int. Cl.
*G01C 3/08* (2006.01)
*G02F 1/29* (2006.01)
(Continued)

(52) U.S. Cl.
CPC .............. *G02F 1/293* (2013.01); *G01S 7/484* (2013.01); *G01S 7/4817* (2013.01); *G01S 7/4868* (2013.01); *H01S 3/1075* (2013.01)

(58) Field of Classification Search
CPC ........ G01S 7/487; G01S 7/484; G01S 7/4868; H01S 3/1075; G02F 1/293
See application file for complete search history.

(56) References Cited

U.S. PATENT DOCUMENTS

| | | |
|---|---|---|
| 3,843,231 A | 10/1974 | Borel et al. |
| 4,066,334 A | 1/1978 | Fray et al. |
| | (Continued) | |

FOREIGN PATENT DOCUMENTS

| | | | | |
|---|---|---|---|---|
| CN | 209911542 U | * | 1/2020 | ............. G01S 7/481 |
| CN | 110998365 A | * | 4/2020 | ............. G01S 17/88 |
| | (Continued) | | | |

OTHER PUBLICATIONS

Roy M. Matic "Blazed phase liquid crystal beam steering", Proc. SPIE 2120, Laser Beam Propagation and Control, (Jun. 8, 1994).
Boris Apter, Eldad Bahat-Treidel, and Uzi Efron "Continuously controllable, wide-angle liquid crystal beam deflector based on the transversal field effect in a three-electrode cell," Optical Engineering 44(5), 054001 (May 1, 2005).
(Continued)

*Primary Examiner* — Mark Hellner
(74) *Attorney, Agent, or Firm* — Fox Rothschild LLP

(57) ABSTRACT

A liquid crystal based optical deflector includes a light source array configured to generate a laser beam, an optical deflector including a plurality of liquid crystal cells, which transmit the laser beam, the optical deflector configured to deflect a transmission path of the laser beam depending on a gradually increased voltage profile applied to the plurality of liquid crystal cells, an optics assembly configured to scan the laser beam deflected by the optical defector in a horizontal direction, and a controller configured to adjust the voltage profile applied to the plurality of liquid crystal cells.

12 Claims, 21 Drawing Sheets

(51) Int. Cl.
    *H01S 3/107*     (2006.01)
    *G01S 7/486*     (2020.01)
    *G01S 7/484*     (2006.01)
    *G01S 7/481*     (2006.01)

(56) References Cited

U.S. PATENT DOCUMENTS

| | | | |
|---|---|---|---|
| 4,639,091 | A | 1/1987 | Huignard et al. |
| 4,964,701 | A * | 10/1990 | Dorschner .............. G02F 1/292 |
| | | | 349/139 |
| 7,403,269 | B2 | 7/2008 | Yamashita et al. |
| 8,675,181 | B2 | 3/2014 | Hall |
| 2005/0271325 | A1 | 12/2005 | Anderson et al. |
| 2010/0020306 | A1 | 1/2010 | Hall |
| 2015/0055117 | A1 | 2/2015 | Pennecot et al. |
| 2015/0185313 | A1 | 7/2015 | Zhu |
| 2016/0161600 | A1 | 6/2016 | Eldada et al. |
| 2017/0269215 | A1 | 9/2017 | Hall et al. |
| 2020/0200877 | A1 * | 6/2020 | Yoo ....................... G01S 7/4817 |

FOREIGN PATENT DOCUMENTS

| | | | |
|---|---|---|---|
| DE | 10 2015 106595 A1 | 11/2016 | |
| JP | 2018197680 A * | 12/2018 | ............. G01S 7/481 |
| WO | 2017-042097 A1 | 3/2017 | |
| WO | 2018-055513 A2 | 3/2018 | |
| WO | 2018-091970 A1 | 5/2018 | |

OTHER PUBLICATIONS

Young Kim, Kanghee Won, Yunhee Kim, Jungkuen An, Hoon Song, Sunil Kim, Chil-Sung Choi, Hong-Seok Lee, "Electrically tunable transmission-type beam deflector using liquid crystal with high angular resolution". Applied Optics, vol. 57, No. 18, Jun. 20, 2018.

Scott R. Davis, George Farca, Scott D. Rommel, Alan W. Martin, and Michael H. Anderson "Analog, non-mechanical beam-steerer with 80 degree field of regard", Proc. SPIE 6971, Acquisition, Tracking, Pointing, and Laser Systems Technologies XXII, 69710G (Mar. 24, 2008).

Jesse A. Frantz, Jason D. Myers, Robel Y. Bekele, Christopher M. Spillmann, Jawad Naciri, Jakub Kolacz, Henry G. Gotjen, Vinh Q. Nguyen, Collin C. McClain, L. Brandon Shaw, and Jasbinder S. Sanghera, "Chip-based nonmechanical beam steerer in the midwave infrared," J. Opt. Soc. Am. B 35, C29-C37 (2018).

Oliver Willekens, Xiaoning Jia, Michael Vervaeke, Xiaobing Shang, Tigran Baghdasaryan, Hugo Thienpont, Herbert De Smet, Kristiaan Neyts, and Jeroen Beeckman, "Reflective liquid crystal hybrid beam-steerer," Opt. Express 24, 21541-21550 (2016).

Xu Wang, Daniel Wilson, Richard Muller, Paul Maker, and Demetri Psaltis, "Liquid-crystal blazed-grating beam deflector," Appl. Opt. 39, 6545-6555 (2000).

Sajjad A. Khan and Nabeel A. Riza, "Demonstration of 3-dimensional wide angle laser beam scanner using liquid crystals," Opt. Express 12, 868-882 (2004).

* cited by examiner

NEAR FIELD ELECTRIC FIELD (NEAR-FIELD, 0-500μm)
USING FDTD CALCULATED (DEFLECTION ANGLES OF
2°, 5°, AND 10° FROM THE LEFT)

LIQUID CRYSTAL BASED OPTICAL DEFLECTOR AND OPTICAL SCANNER USING THE SAME

CROSS-REFERENCE TO RELATED APPLICATION

This application claims under 35 U.S.C. § 119(a) the benefit of Korean Patent Application No. 10-2019-0130198, filed in the Korean Intellectual Property Office on Oct. 18, 2019, the entire contents of which are incorporated herein by reference.

BACKGROUND

(a) Technical Field

The present disclosure relates to a liquid crystal based optical deflector and an optical scanner using the same.

(b) Description of the Related Art

Light Detection and Ranging ("LiDAR"), which measures distance using a laser, has been applied to an autonomous vehicle, where LiDAR has been identified as a core technology for operation of autonomous vehicles. A LiDAR sensor applied to a vehicle may support autonomous driving and collision avoidance by measuring a distance from another vehicle, a pedestrian, or an obstacle around the vehicle which is moving.

The LiDAR sensor includes a laser emitter that radiates (emits) a laser beam, a laser detector (or a laser receiver) that receives (detects) a laser beam returned after being radiated from the laser emitter and reflected by an object, and a processor that calculates a distance between the LiDAR sensor and the object using the laser beam received through the laser detector. When measuring the distance through the LiDAR sensor, the laser emitter scans the laser beam in one direction by using a motor or a micron-size mirror. This conventional beam scanning (scan) technique has limitations in operating speed, stability, and durability.

SUMMARY

An aspect of the present disclosure provides a liquid crystal based optical deflector that is capable of performing beam scanning by electrical control without mechanical driving using an electro-optical characteristic of a liquid crystal, and an optical scanner using the same.

Another aspect of the present disclosure provides an optical scanner employing at least two optical deflectors, the optical scanner being capable of compensating for light loss resulting from an electro-optical characteristic of the optical defector and of uniformly outputting light.

According to an aspect of the present disclosure, an optical deflector includes a first substrate and a second substrate disposed opposite to each other, a plurality of liquid crystal cells formed between the first substrate and the second substrate and partitioned by a partition wall, a first partition wall electrode and a second partition wall electrode formed on inner partition wall surfaces, respectively, in each of the liquid crystal cells, a first electrode array having a plurality of electrodes regularly arranged on the first substrate inside each of the liquid crystal cells, a second electrode array disposed on the second substrate inside each of the liquid crystal cells to be symmetrical to the first electrode array, a first external connector formed on the first substrate to connect the first partition wall electrode, the second partition wall electrode, and the first electrode array to an outside, and a second external connector formed on the second substrate to connect the second electrode array to the outside.

Antireflective coating layers are formed on outer surfaces of the first substrate and the second substrate, respectively.

An antireflective coating layer is formed on one of outer surfaces of the first substrate and the second substrate, and a reflective coating layer is formed on a remaining one of the outer surfaces of the first substrate and the second substrate.

According to another aspect of the present disclosure, an optical scanner includes a light source array to generate a laser beam, an optical deflector including a plurality of liquid crystal cells, which transmit the laser beam, the optical deflector configured to deflect a transmission path of the laser beam depending on a voltage applied to the plurality of liquid crystal cells, an optical instrument configured to scan the laser beam deflected by the optical defector in a horizontal direction, and a controller configured to adjust the voltage applied to the plurality of liquid crystal cells.

The light source array includes a plurality of laser light sources arranged in a vertical direction.

The light source array emits a beam collimated through a collimating lens.

Each of the liquid crystal cells includes a first partition wall electrode and a second partition wall electrode formed on partition wall surfaces which partition the liquid crystal cells, a first electrode array including electrodes formed on a first substrate and arranged with a predetermined spacing, and a second electrode array formed on a second substrate to be symmetrical to the first electrode array.

The controller applies gradually varied voltages to the electrodes of the first electrode array while gradually increasing the voltage from the first partition wall electrode to the second partition wall electrode, and apply gradually varied voltages identical to the voltages, which are applied to the electrodes of the first electrode array, to electrodes of the second electrode array, which are symmetrical to the electrodes of the first electrode array.

The controller applies a preset minimum voltage to one of the first partition wall electrode and the second partition wall electrode, and applies a preset maximum voltage to a remaining one of the first partition wall electrode and the second partition wall electrode.

The controller adjusts a steering angle of a laser beam incident into the optical deflector by adjusting the maximum voltage.

The optical scanner further includes at least one light source array and a least one optical deflector.

The optical deflector is interposed between the light source array and the optical instrument, when the optical deflector is in a transmission type.

The light source array and the optical instrument are positioned at one side of the optical deflector when the optical deflector is a reflective type.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
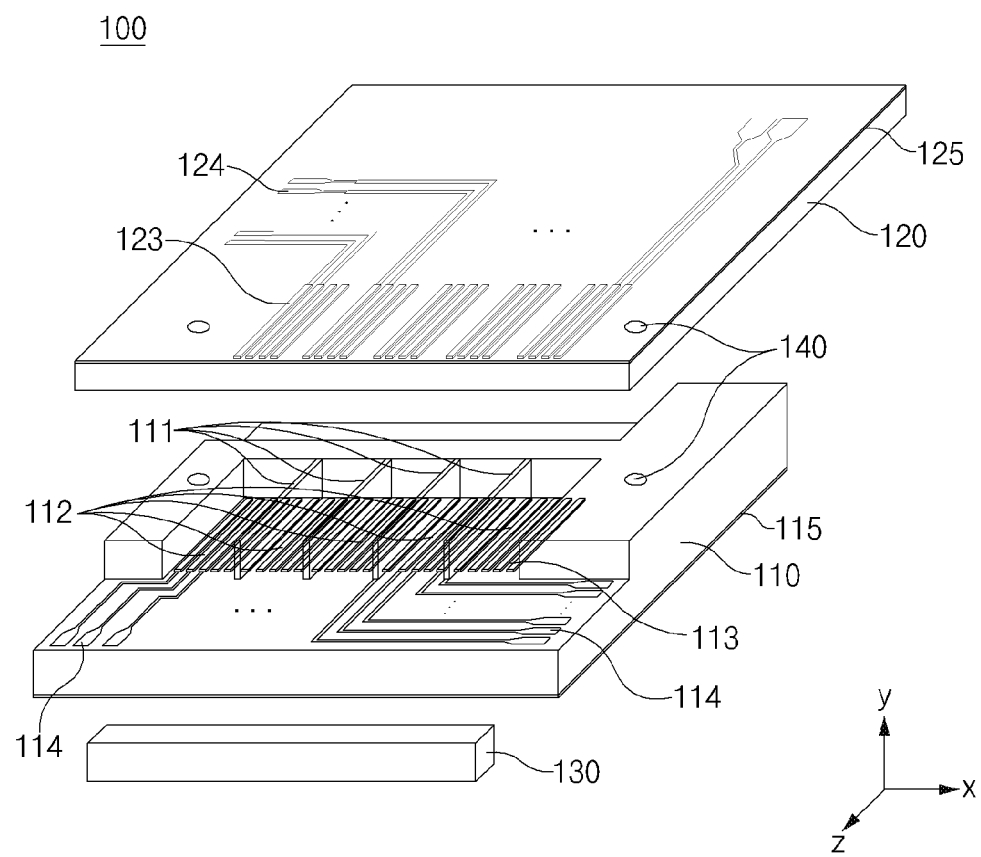
FIG. 1 is an exploded perspective view illustrating an optical deflector, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings In addition, in the following description of an embodiment of the present disclosure, a detailed description of well-known features or functions will be ruled out in order not to unnecessarily obscure the gist of the present disclosure In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application The present disclosure utilizes an optical deflector (beam scanner) to allow lower voltage and lower power driving based on a liquid crystal material while producing an excellent light scanning efficiency. Particularly, an optical scanner, which supports a long distance observation and a high-speed measuring function, is necessary to apply the optical deflector to a vehicle. Accordingly, the present disclosure provides a liquid crystal based optical deflector which shows a more rapid operating speed and easier scalability when compared to conventional mechanical type optical deflectors.

Figure 2:
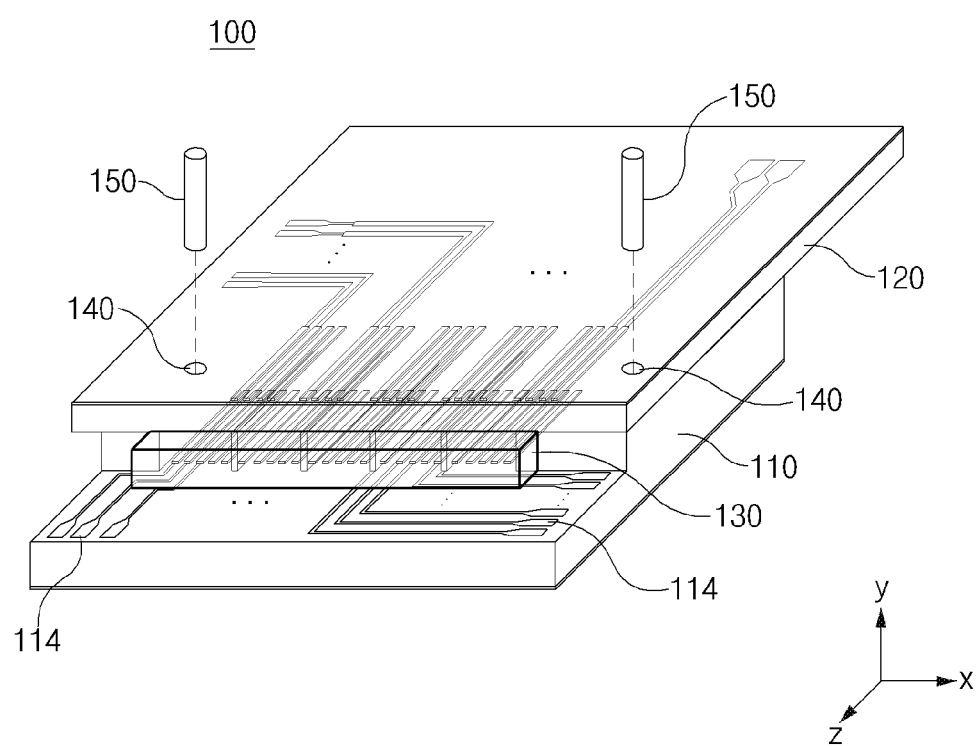
FIG. 2 is a view illustrating an assembly of the optical deflector, according to an embodiment of the present disclosure.
Figure 3:
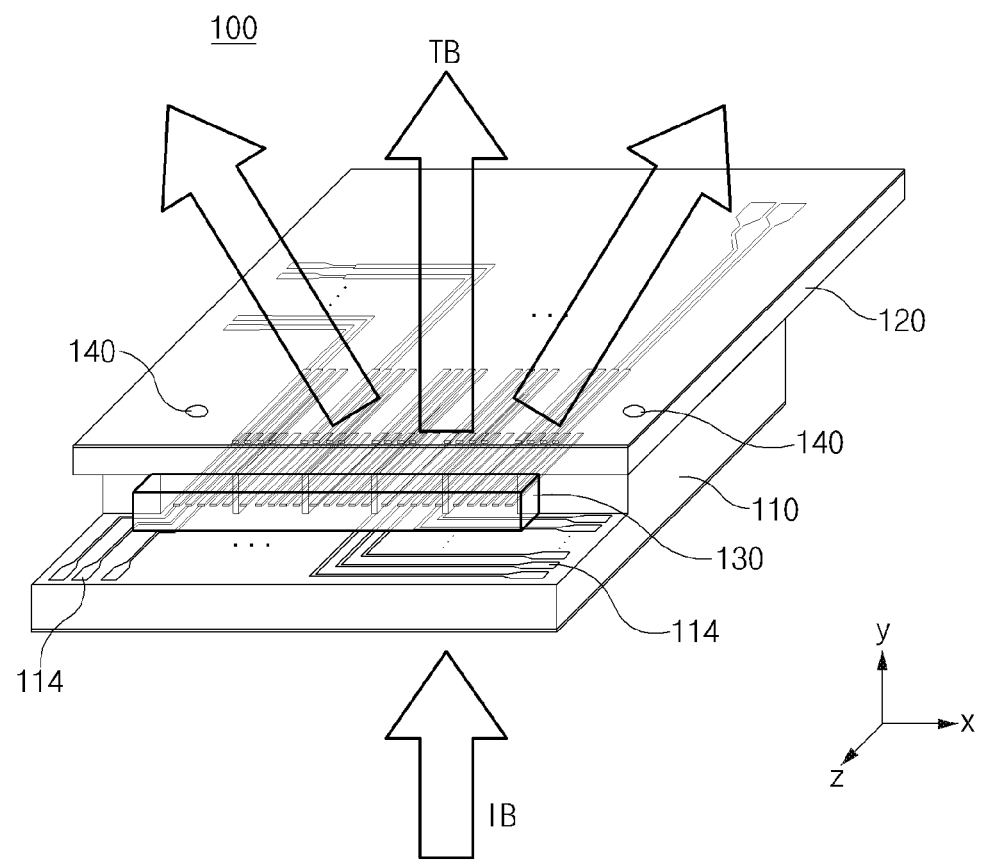
FIG. 3 is a view illustrating operation of the optical deflector, according to an embodiment of the present disclosure.
Figure 4:
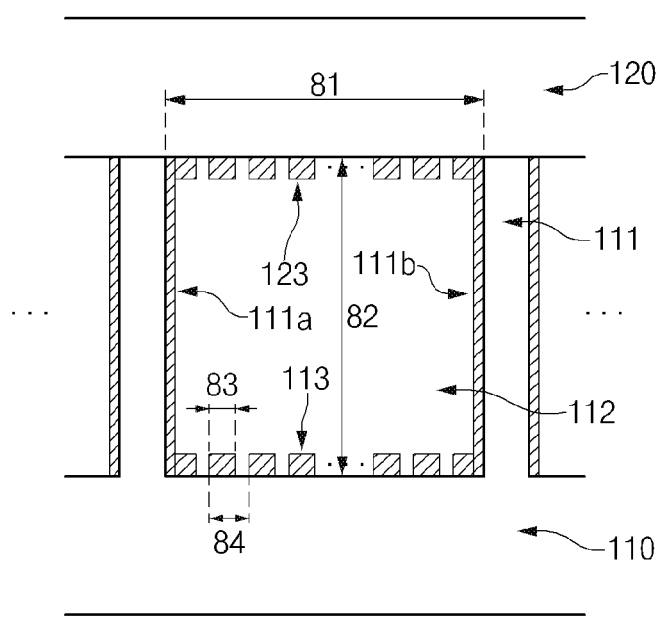
FIG. 4 is a sectional view illustrating a liquid crystal cell in the optical deflector, according to an embodiment of the present disclosure.
Figure 5:
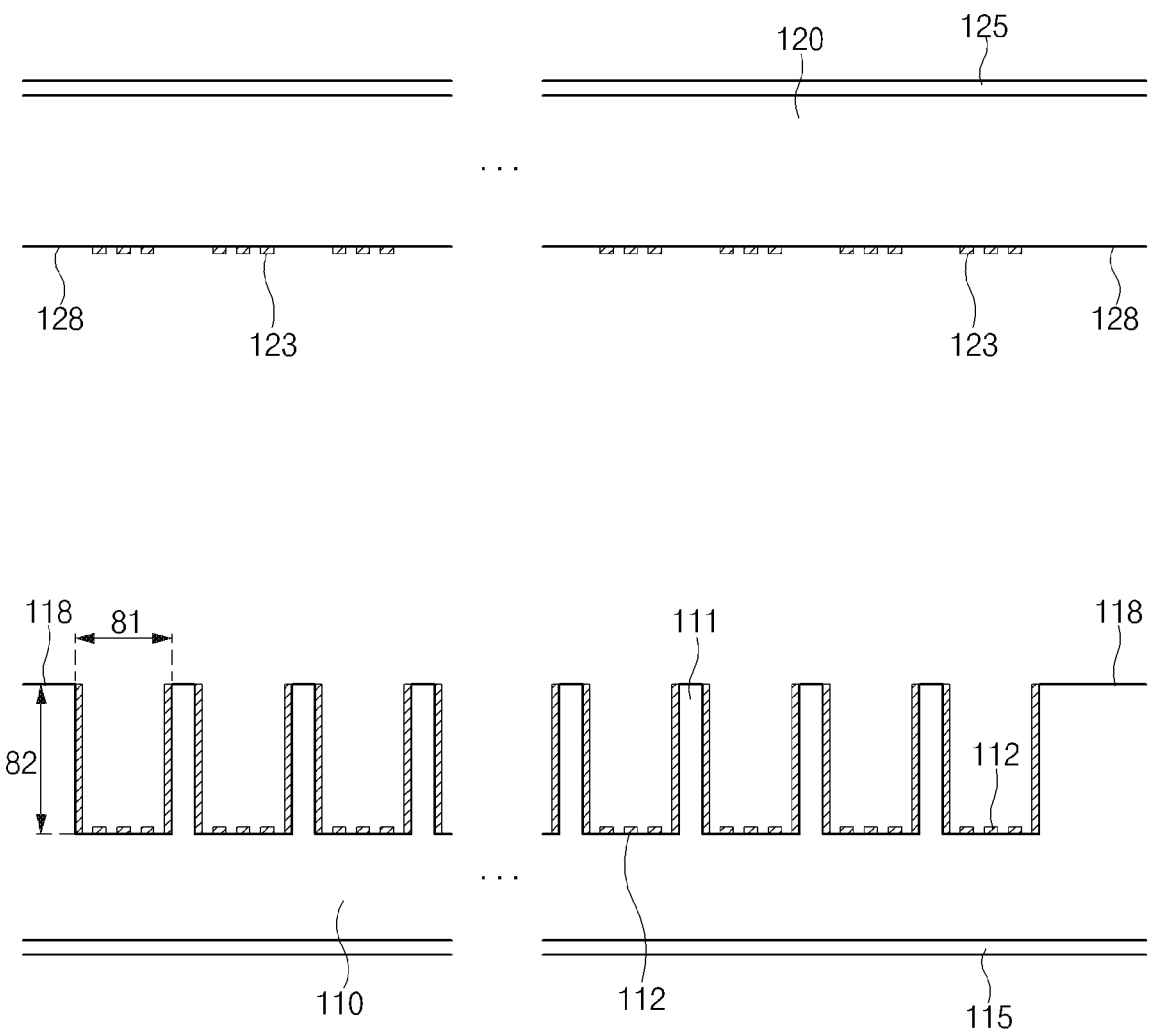
FIG. 5 is a sectional view illustrating the optical deflector illustrated in FIG. 1.

FIG. 1 is an exploded perspective view illustrating an optical deflector, according to an embodiment of the present disclosure, FIG. 2 is a view illustrating an assembly of the optical deflector, according to an embodiment of the present disclosure, FIG. 3 is a view illustrating operation of the optical deflector, according to an embodiment of the present disclosure, FIG. 4 is a sectional view illustrating a liquid crystal cell in the optical deflector, according to an embodiment of the present disclosure, and FIG. 5 is a sectional view illustrating the optical deflector illustrated in FIG. 1.

As illustrated in FIGS. 1 to 10, an optical deflector 100 includes a first substrate 110, a second substrate 120, a sealing member 130, an alignment hole 140, and an alignment member 150.

The first substrate 110 and the second substrate 120 are disposed to face each other, and are substrates (transparent substrates) which are formed of glass, silicon nitride (SiN), or silicon nitride oxide (SiNO). A plurality of liquid crystal cells 112 are formed between the first substrate 110 and the second substrate 120 and partitioned by a partition wall 111.

To form the plurality of liquid crystal cells 112, as illustrated in FIG. 4, an exposure process and an etching process using a mask are performed with respect to a first surface (top surface) of the first substrate 110 to repeatedly form grooves 112, each of which has a width 81 of about 5 to 20 μm, and a depth 82 of about 15 to 50 μm, at a predetermined spacing. In this case, the partition wall 111 is formed with a thickness of several microns (e.g., 1-2 μm) or less between grooves (liquid crystal cells described later) 112. The width (area) of the groove 112 may have a size in the range of about 5 to 20 μm and the number of grooves to be repeated may be adjusted depending on the beam spot size of a light source beam (that is, the laser beam).

The first substrate 110 having the grooves 112 is thinly coated with a transparent material such as Indium Tin Oxide (ITO) through deposition or spin-coating. Thereafter, an exposure and etching process is performed with respect to the resultant structure using a mask to form electrodes (that is, a first electrode array 113) having the width of about 0.05-1 μm and a periodic interval 84 of about 0.1-2 μm length on the bottom surface of the groove 112. In other words, the first electrode array 113 is formed on the first substrate 110 inside the liquid crystal cell 112 such that the distance between the electrodes is half of the periodic interval 84.

In addition, ITO films coated on the wall surface of the groove, that is, the surface of the partition wall 111, is formed as the electrodes 111a and 111b. In other words, a first partition wall electrode 111a and a second partition wall electrode 111b are formed on a first partition wall surface and a second partition wall surface facing the inner parts of the liquid crystal cell 112, respectively. The first partition wall electrode 111a and the second partition wall electrode 111b allow forming a refractive index distribution profile having an ideal saw-tooth shape inside the liquid crystal cell 112.

A first external connector 114 is formed on the first surface (top surface) of the first substrate 110. The first external connector 114 allows the first electrode array 113, the first partition wall electrode 111a, and the second partition wall electrode 111b to be connected to an external circuit. For example, the first external connector 114 electrically connects the optical deflector 100 to a controller 230 described later. The first electrode array 113, the first partition wall electrode 111a, and the second partition wall electrode 111b extend to the first external connector 114.

The first surface (bottom surface) of the second substrate 120 is coated with a transparent material such as ITO, and then a second electrode array 123 having the same electrode width and the same periodicity as those of the first electrode array 113 is formed at a position symmetrical to a position of the first electrode array 113 formed on the bottom surface of the groove of the first substrate 110. A second external connector 124 is formed on the first surface of the second substrate 120 while extending such that the second electrode array 123 is connected to the outside.

After forming electrodes on the first substrate 110 and the second substrate 120, the entire surfaces of both substrates having the electrodes are coated with an alignment material such as polyimide, and then heat-treated. Next, the alignment material (e.g., polyimide) is removed from the groove wall surfaces of the first substrate 110, that is, the partition walls 111.

The first electrode array 113 and the second electrode array 123 formed on the first substrate 110 and the second substrate 120, respectively, are aligned to be symmetrical to each other about an x-z plane using the alignment holes 140 formed in the first substrate 110 and the second substrate 120. In this case, the first substrate 110 and the second substrate 120 may be aligned by inserting the alignment member 150 into the alignment hole 140. The first substrate 110 and the second substrate 120 are aligned, and bonded to each other using an adhesive, thereby completing the assembly of the first substrate 110 and the second substrate 120. For example, referring to FIG. 5, opposite ends of the top surface 118 of the first substrate 110 are bonded to opposite ends of the bottom surface 128 of the second substrate 120 such that the first substrate 110 and the second substrate 120 are assembled.

Liquid crystals are injected into the grooves, that is, liquid crystal cells 112 between the assembled first substrate 110 and the second substrate 120. In this case, an ultrasonic wave or a sound wave may be applied to the liquid crystal cell 112 such that the liquid crystal is uniformly filled in the liquid crystal cells 112. When the liquid crystal is completely injected into the liquid crystal cells 112, a liquid crystal injection hole formed in the lateral side of the liquid crystal cell 112 is closed using a sealing member 130 including Mylar, vinyl, or Teflon. After disposing the sealing member 130 to close the liquid crystal injection hole while preventing the first external connectors 114, that is, the first external connector array from being covered, sealing is performed using the adhesive to prevent the liquid crystal from flowing out of the assembly.

Thereafter, heat treatment or ultraviolet treatment is performed depending on the liquid crystal material such that the direction of the liquid crystal molecular is aligned between the first substrate 110 and the second substrate 120, thereby completing the transparent liquid crystal based optical deflector 100.

Adjusted electrical voltages are applied to the first external connectors 114 (the first external electrode array) and the second external connectors 124 (the second external electrode) of the optical deflector 100 by gradually increasing from one wall side to the other wall side within each liquid crystal cell to have the refractive index profile of the internal liquid crystal gradually changed, and the same voltage pattern is periodically repeated from a cell to next cells. A beam (incident beam; IB) incident vertically onto a transparent window (liquid crystal cell) of the first substrate 110 and the second substrate 120 passes through the liquid crystal cell 112 while being changed in diffraction angle depending on the voltage applied to a plurality of liquid crystal cells 112. Accordingly, the irradiation direction of a transmission beam (TB) passing through the liquid crystal cells 112 may be changed as illustrated in FIG. 3. In other words, the irradiation direction (the transmission path) of the beam passing through the liquid crystal cell 112 may be adjusted by adjusting the voltage applied to the liquid crystal cell 112.

When the optical deflector 100 is a transmission type, antireflective coating is performed on the second surface (bottom surface) of the first substrate 110 and the second surface (top surface) of the second substrate 120, thereby forming antireflective coating layers 115 and 125. Meanwhile, when the optical deflector 100 is a reflective type, high reflection coating is performed to any one of the second surface of the first substrate 110 and the second surface of the second substrate 120.

Figure 6A:
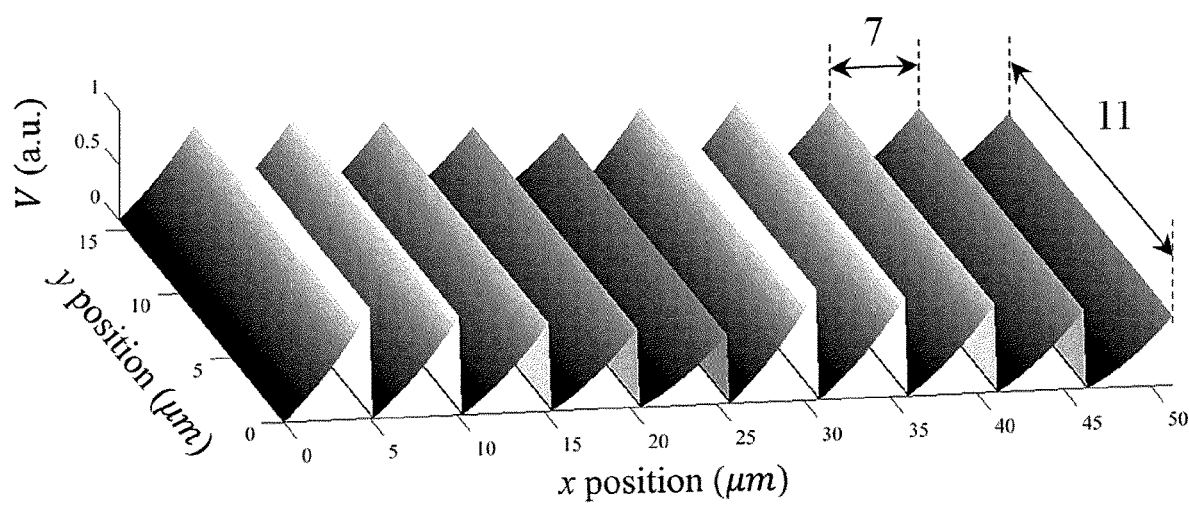
FIG. 6A is a view illustrating the distribution of voltage in a liquid crystal cell of an optical deflector, according to an embodiment of the present disclosure.
Figure 6B:
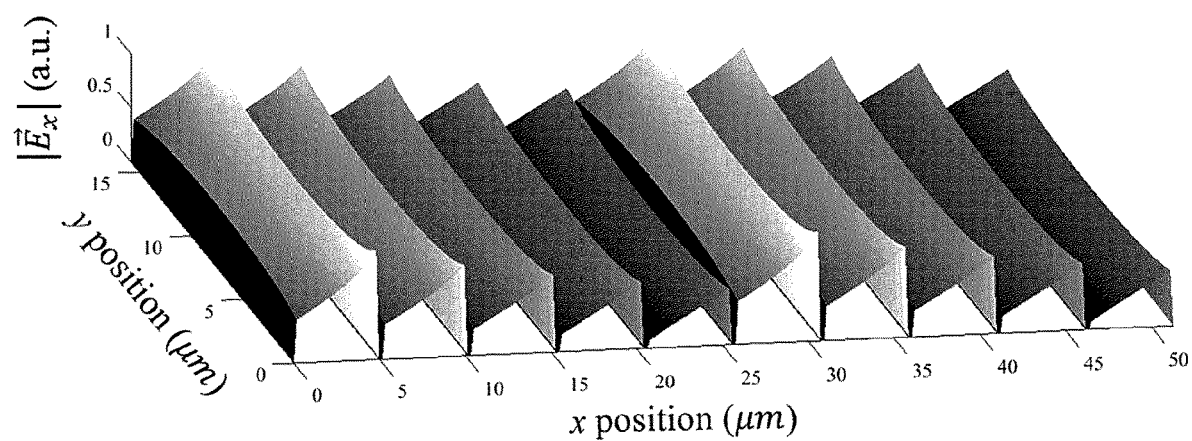
FIG. 6B is a view illustrating the distribution of an electric field in a liquid crystal cell of the optical deflector, according to an embodiment of the present disclosure.
Figure 6C:
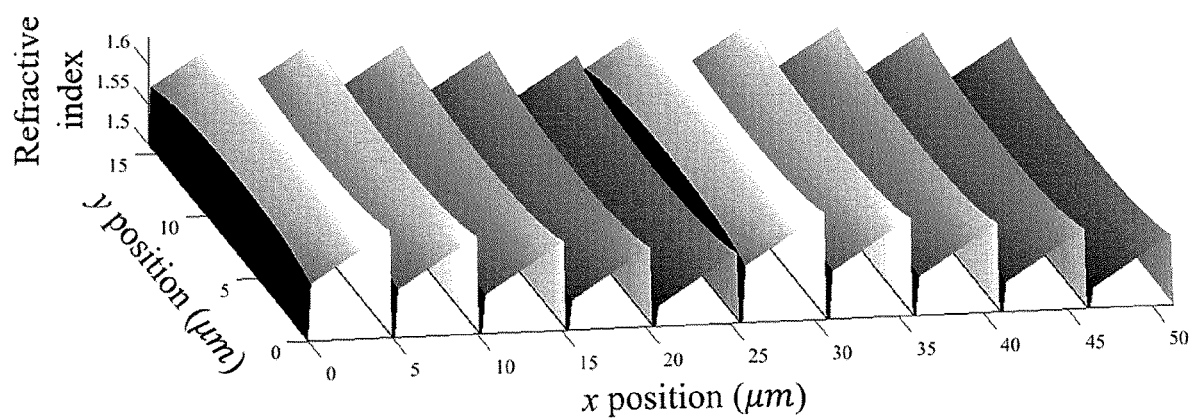
FIG. 6C is a view illustrating the variation of a refractive index in a liquid crystal cell of the optical deflector, according to an embodiment of the present disclosure.

FIG. 6A is a view illustrating the voltage profile in the liquid crystal cells of the optical deflector, according to an embodiment of the present disclosure, FIG. 6B is a view illustrating the electric field profile in the liquid crystal cells of the optical deflector, according to an embodiment of the present disclosure, and FIG. 6C is an exemplary view illustrating the refractive index profile in the liquid crystal cells of the optical deflector, according to an embodiment of the present disclosure. Hereinafter, an exemplary demonstrated case according to the present embodiment of the optical deflector 100 shows the beam deflection of the incident beam by an angle of 8°.

The preset minimum voltage is applied to the first partition wall electrode 111a in each liquid crystal cell 112, and the preset maximum voltage is applied to the second partition wall electrode 111b in the liquid crystal cell 112. The same voltages are applied to symmetrical electrodes between the first electrode array 113 and the second electrode array 123 in each liquid crystal cell 112. In this case, the applied voltages are sequentially increased from the electrodes adjacent to the first partition wall electrode 111a to the electrodes adjacent to the second partition wall electrode 111b. In this case, the maximum voltage is determined depending on the required diffraction angle. For the case that the maximum voltage is applied to deflect the incident beam by 8°, the voltage profile in a plurality of liquid crystal cells 112 is illustrated in FIG. 6A, and the corresponding electric field profile in the plurality of liquid crystal cells 112 is illustrated as in FIG. 6B. As illustrated in FIGS. 6A and 6B, the voltage and electric field profiles in each liquid crystal cell 112 have the sawtooth shapes which can improve the diffraction efficiency.

When a liquid crystal capable of vertical alignment is used, the liquid crystal is vertically aligned between the first substrate 110 and the second substrate 120 at no voltage applied situation of the liquid crystal cell 112. Thereafter, the gradually varied voltage profile is applied to the liquid crystal cells 112 to form the electric field profile inside the liquid crystal cells as illustrated in FIG. 6B which causes a horizontally aligned liquid crystal profile and finally form the refractive index profile as illustrated in FIG. 6C. The length of the liquid crystal cell 112 along the y-axis (corresponding to the z-axis in FIGS. 1 and 12) direction may be determined depending on the size of the incident beam, and the cell size along the x-axis direction may be adjusted by increasing or decreasing the number of the liquid crystal cells 112 to cover the beam size.

Figure 7A:
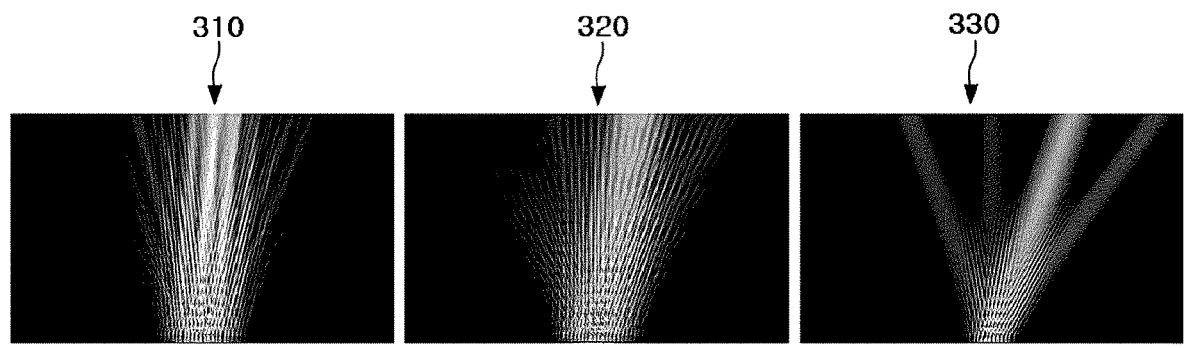
FIGS. 7A to 7C are views illustrating the operating characteristic of the optical deflector, according to an embodiment of the present disclosure.
Figure 7B:
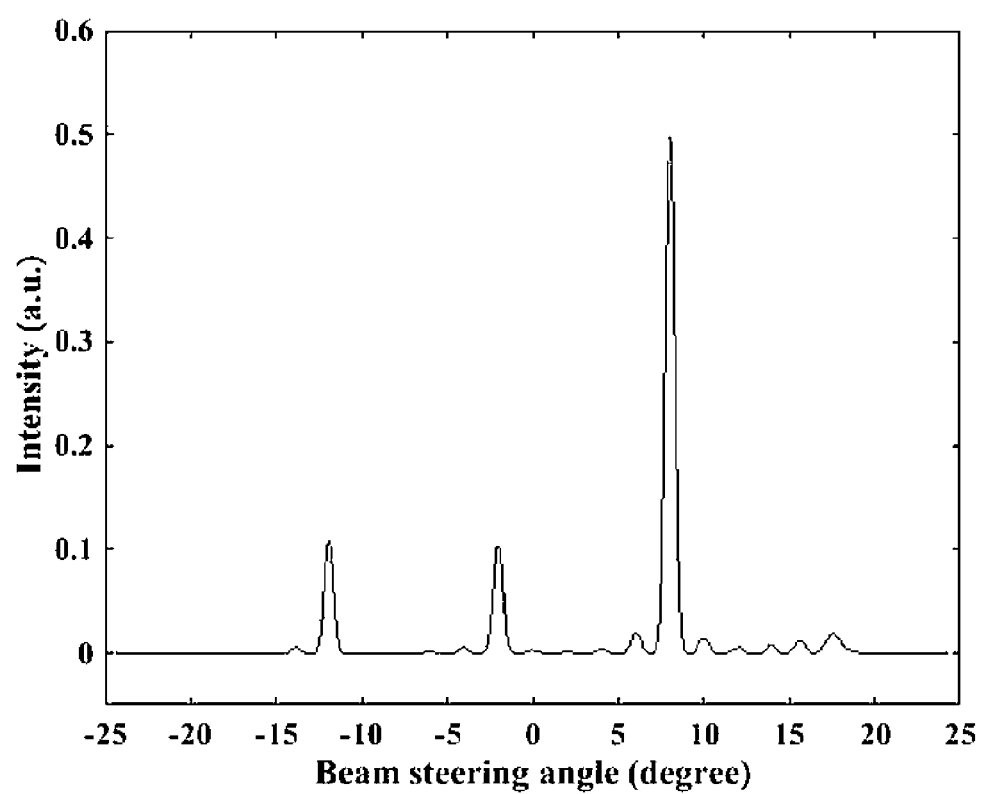
Figure 7C:
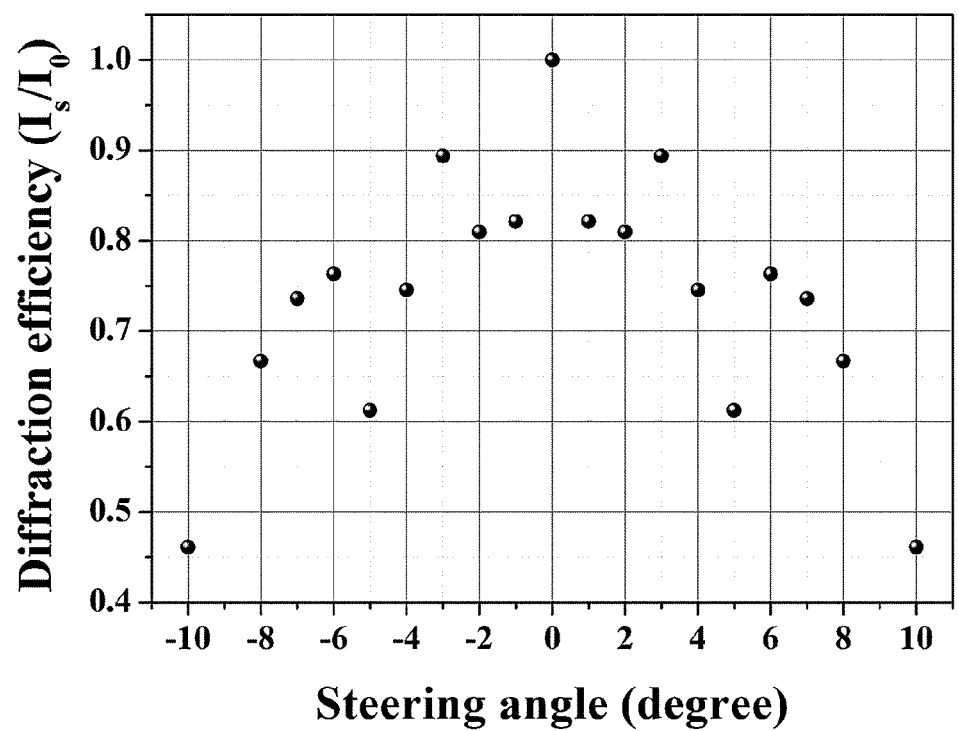

FIGS. 7A to 7C are views illustrating the operating characteristic of the optical deflector for an exemplary case, according to an embodiment of the present disclosure.

According to a result of Finite-Difference Time-Domain (FDTD) simulation for the case that the beam vertically incident onto the optical deflector 100 passes through the liquid crystal cells 112 to be deflected by 2°, 5°, and 10°, the near-field electric field profile of the deflected optical beam after passing through the liquid crystal cell 112 is shown in FIG. 7A.

According to the result of the simulation for the case that the diffraction angle of the beam deflected by the optical deflector 100 is 8°, the far-field beam intensity distribution from the optical deflector 100 is illustrated as in FIG. 7B.

When adjusting the steering angle of the beam by adjusting the voltage applied to the liquid crystal cells of the optical deflector 100, the relative beam intensity distribution of the far-field deflected beam compared to the beam intensity of the straightly propagating beam, that is, the diffraction efficiency, is illustrated as a function of the beam steering angle in FIG. 7C.

Figure 8:
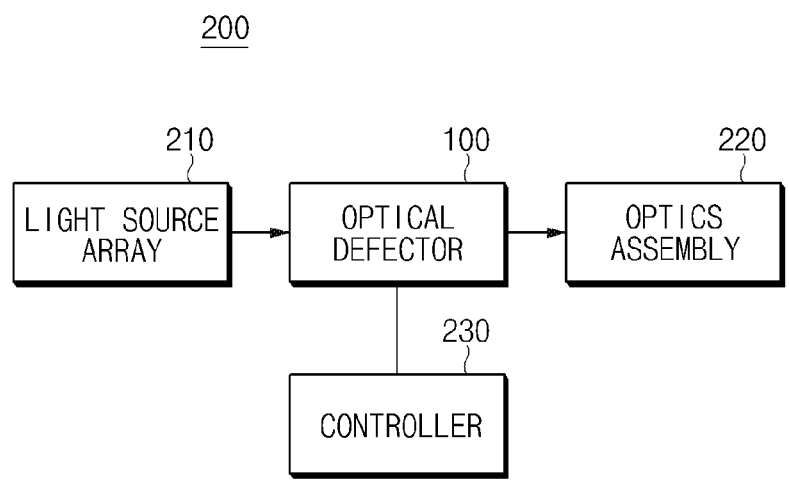
FIG. 8 is a block diagram illustrating an optical scanner according to an embodiment of the present disclosure.
Figure 9:
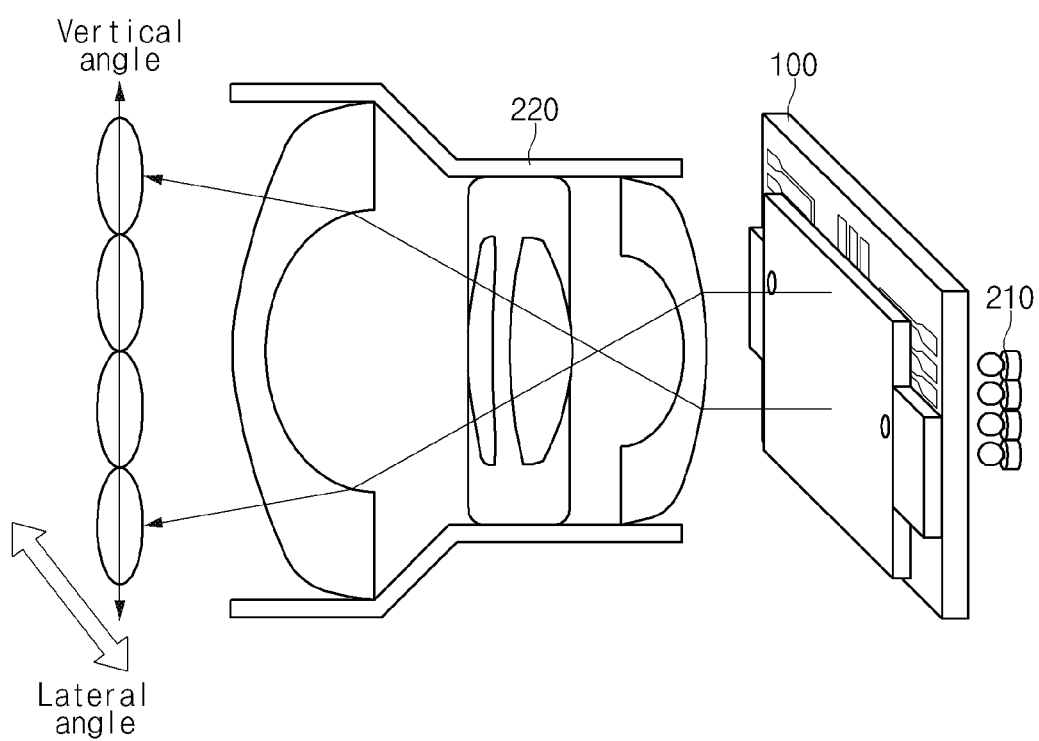
FIG. 9 is a view illustrating the structure of an optical instrument illustrated in FIG. 8.

FIG. 8 is a block diagram illustrating an optical scanner according to an embodiment of the present disclosure, and FIG. 9 is a view illustrating the structure of an optical instrument illustrated in FIG. 8. An optical scanner is a device (laser beam transmitter) to transmit a laser beam (laser light) in the LiDAR sensor.

Referring to FIG. 8, an optical scanner 200 emits a laser beam and radiates the laser beam to an object. The optical scanner 200 includes a light source array 210, an optical deflector (beam deflector) 100, an optics assembly 220, and a controller 230.

The light source array 210 is a multi-channel laser beam source array formed by vertically arranging at least one laser beam sources to emit laser beams. The laser light source may include a laser diode. The light source array 210 may emit a beam collimated through a collimating lens.

The optical deflector 100 changes (deflects) the irradiation direction of the laser beam emitted from the light source array 210. In other words, the optical deflector 100 refracts the multi-channel laser light source beam emitted from the light source array 210 in the horizontal direction. The optical deflector 100 scans the laser beam from the light source array 210 in any one horizontal direction (e.g., a direction from left-hand side to right-hand side) under the control of the controller 230.

The optical deflector 100 includes a plurality of liquid crystal cells 112 partitioned (separated) by the partition walls 111. The first partition wall electrode 111a and the second partition wall electrode 111b are formed on the inner partition walls 111 of each liquid crystal cell 112. In addition, the first electrode array 113 is formed on the bottom surface of each liquid crystal cell 112 such that electrodes are arranged at a predetermined spacing, and the second electrode array 123 is formed on the top surface disposed opposite to the bottom surface to be symmetrical to the electrodes of the first electrode array 113.

The optics assembly 220 supports such that the vertically irradiated coverage of the laser beam is scanned in a horizontal direction under deflection with the optical deflector 100. Referring to FIG. 9, the optics assembly 220 covers a vertical field of view (FoV), that is, a vertical illuminating angle using multi-channel laser beams emitted from the light source array 210. In addition, the optics assembly 220 may cover a horizontal field of view using a fisheye lens and/or a wide angle lens.

The controller 230 controls the operation of the optical scanner 200. Although not illustrated in the drawing, the controller 230 may include a memory and a processor. The memory may be implemented with at least one of storage media such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, and/or the like. The processor may include at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and/or microprocessors.

The controller 230 adjusts the steering angle of the laser beam incident on the liquid crystal cells 112 by adjusting a voltage applied to the plurality of liquid crystal cells 112 in the optical deflector 100. The controller 230 applies the preset minimum voltage and the preset maximum voltage to the first partition wall electrode 111a of each liquid crystal cell 112, and the second partition wall electrode 111b, respectively. In addition, the controller 230 applies gradually varying voltages to the electrodes constituting the first electrode array 113 and the second electrode array 123 in each of the liquid crystal cells 112. In this case, the same voltage is applied to the symmetrical electrode pair of the first electrode array 113 and the second electrode array 123.

The LiDAR sensor receives a laser beam that is radiated from the optical scanner 200 and reflected from an object, through a detector module. The detector module may provide, to a signal processing unit of the LiDAR sensor, reception information on the reception time of the laser beam or the phase information of the laser beam. The signal processing unit calculates (measures) the distance between the optical scanner 200 and the object by processing the signals received from the optical scanner 200 and the detector module. The processing module collects transmission information (e.g., information on the transmission time of the laser beam or the phase information of the laser beam) from the optical scanner 200 and receives the reception information of the laser beam from the detector module. The processing module may measure the distance between the optical scanner 200 and the object based on the transmission information and the reception information of the laser beam. In this case, the processing module may calculate the distance by using a time of flight (TOF) method or a phase shift (PS) method. The TOF method is to measure time taken from the laser beam emission to the collection of the reflected beam from the object, and to calculate the distance to the object based on the measured time. The PS method is to calculate the distance by measuring the phase change between the emitted laser beam to the returned beam after reflection from the object FIGS. 10 and 11 are views illustrating exemplary design changes of the optical scanner to expand the scanning range, according to an embodiment of the present disclosure.

Figure 10:
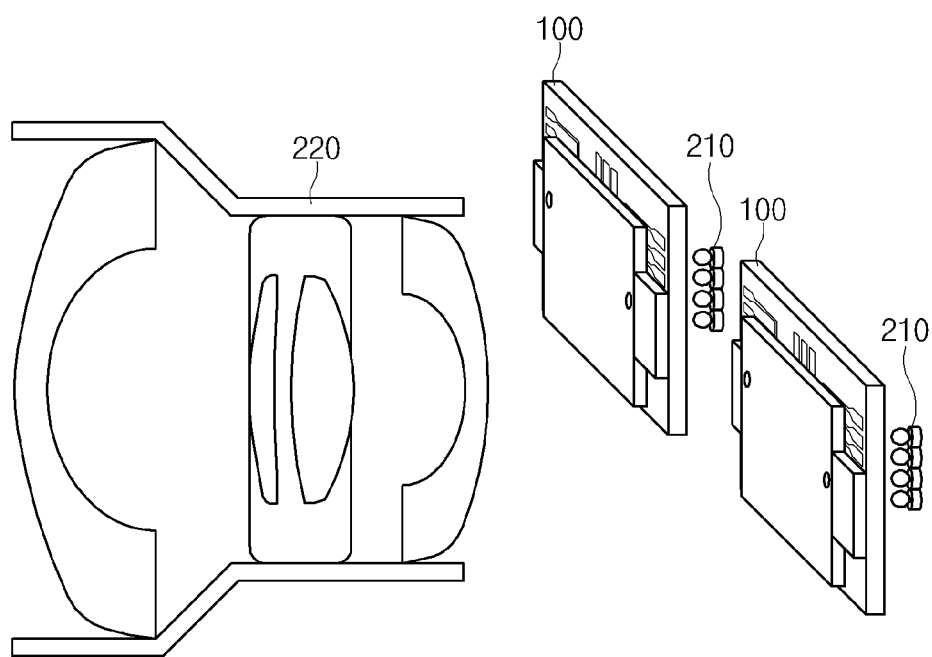
FIGS. 10 and 11 are views illustrating a design change to expand the scanning range of the optical scanner, according to an embodiment of the present disclosure.
Figure 11:
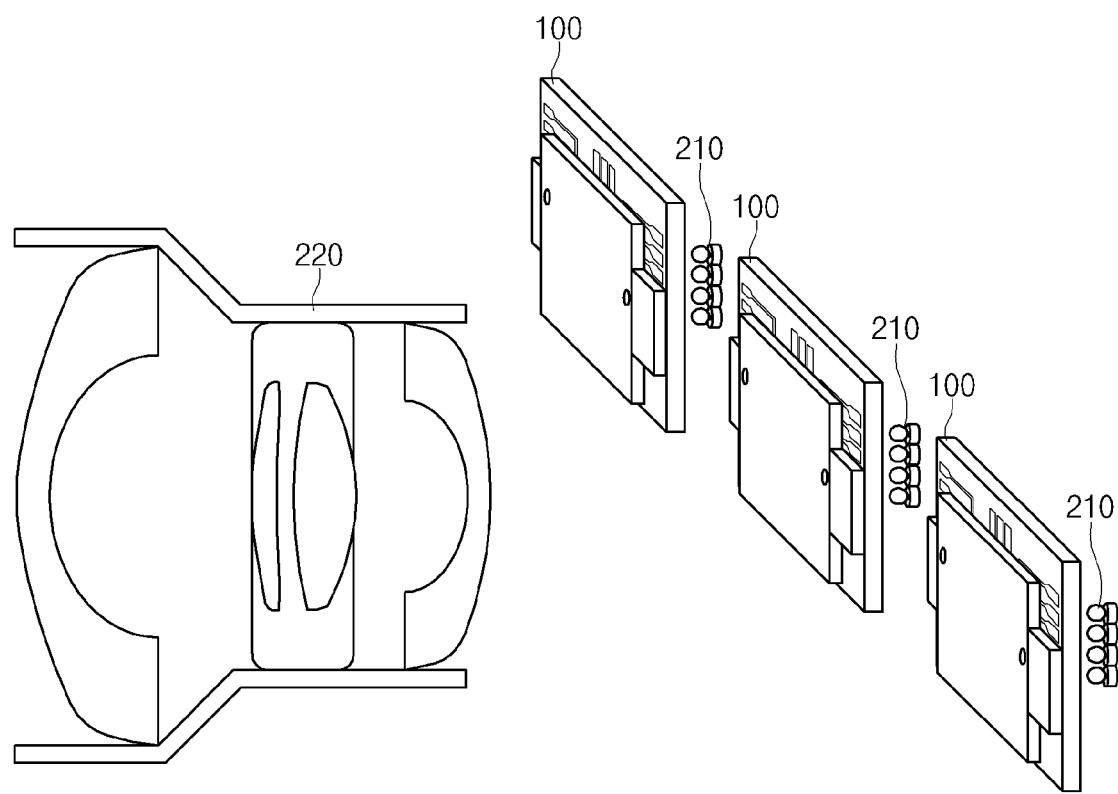

Referring to FIGS. 10 and 11, the horizontal viewing angle of the optical scanner 200 may be expanded, and the uniformity of the beam intensity of the laser beam may be improved using two or three optical deflectors 100 and light source arrays 210. In other words, the number of the optical deflectors 100 and the number of light source arrays 210 are increased in the optical scanner 200, thereby expanding a scanning range (beam irradiation range) and irradiating the laser beam with a uniform intensity.

As described above, at least two optical deflectors 100 and at least two light source arrays 210 are applied to the optical scanner 200, thereby expanding the irradiation range of the laser beam, compensating for the non-uniform intensity distribution profile of the diffracted beam due to a degraded diffraction efficiency as the steering angle is increased with a single optical deflector 100 case, and finally providing a relatively uniform and brighter intensity profile of the scanned beam.

Figure 12:
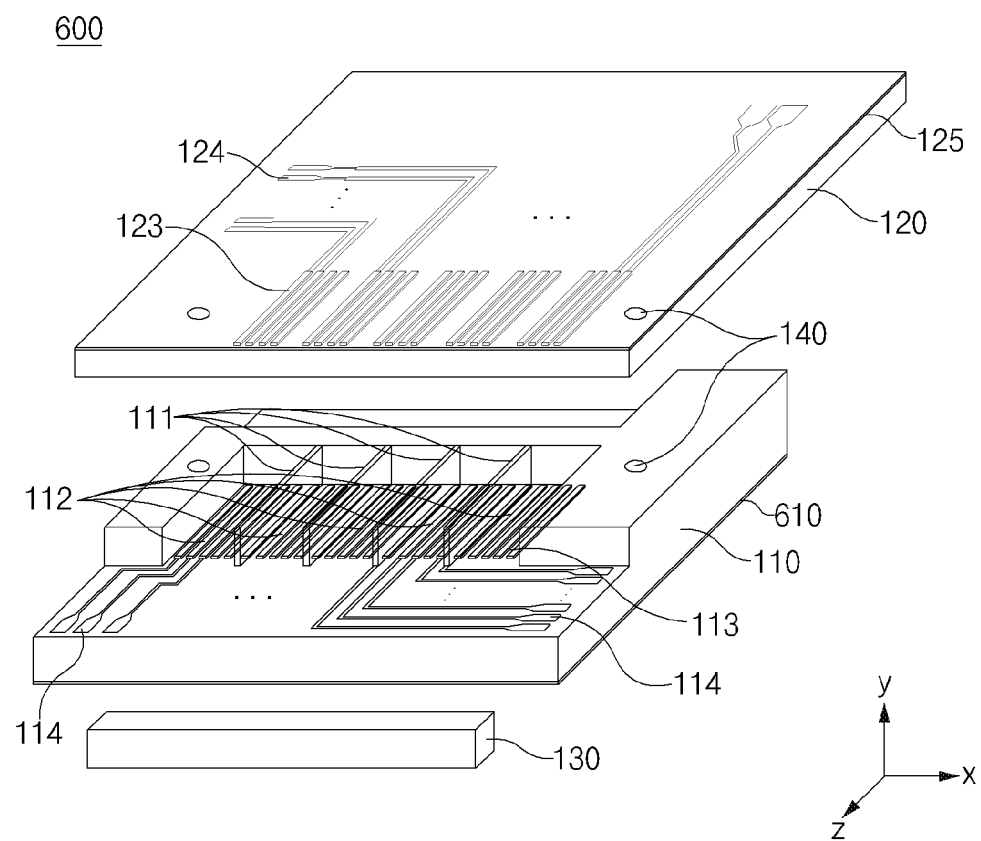
FIG. 12 is a view illustrating an optical deflector, according to another embodiment of the present disclosure.
Figure 13:
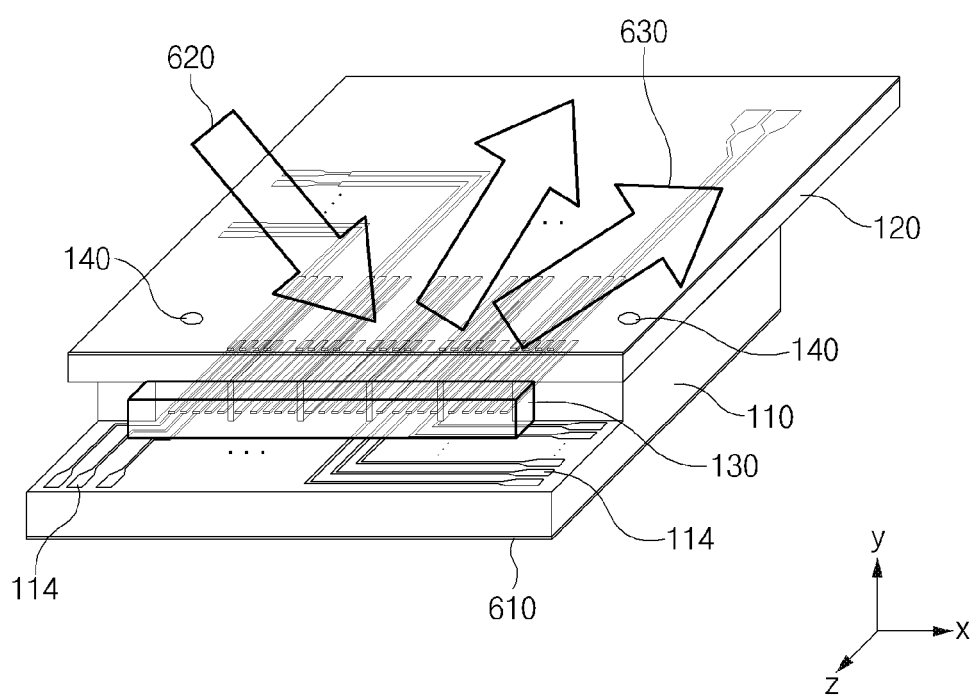
FIG. 13 is a view illustrating the operation of the optical deflector illustrated in FIG. 12.

FIG. 12 is a view illustrating an optical deflector 600, according to another embodiment of the present disclosure, and FIG. 13 is a view illustrating the operation of the optical deflector illustrated in FIG. 12. In the following description of the present embodiment, the duplication description of the same component as that of the optical deflector 100 illustrated in FIG. 1 will be omitted.

Referring to FIG. 12, a reflective coating layer 610 is formed on a second surface, that is, the bottom surface of the first substrate 110. The reflective coating layer 610 is formed by using a metal material or a mirror. The reflective coating layer 610 of the first substrate 110 reflects and diffracts a laser beam incident through the second substrate 120 of the optical deflector 600. As illustrated in FIG. 13, the optical deflector 600 outputs a beam 630 which is deflected by adjusting a reflective angle of an incident beam 620 which is incident through the second substrate 120 depending on voltages applied to the liquid crystal cells 112.

Figure 14:
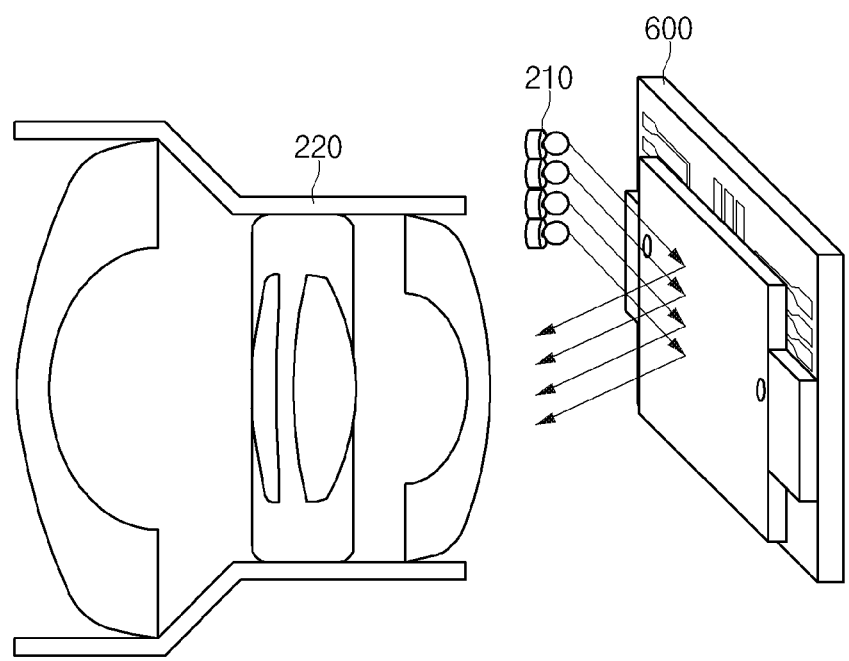
FIGS. 14 and 15 are views illustrating the optical scanner employing the optical deflector, according to another embodiment of the present disclosure.
Figure 15:
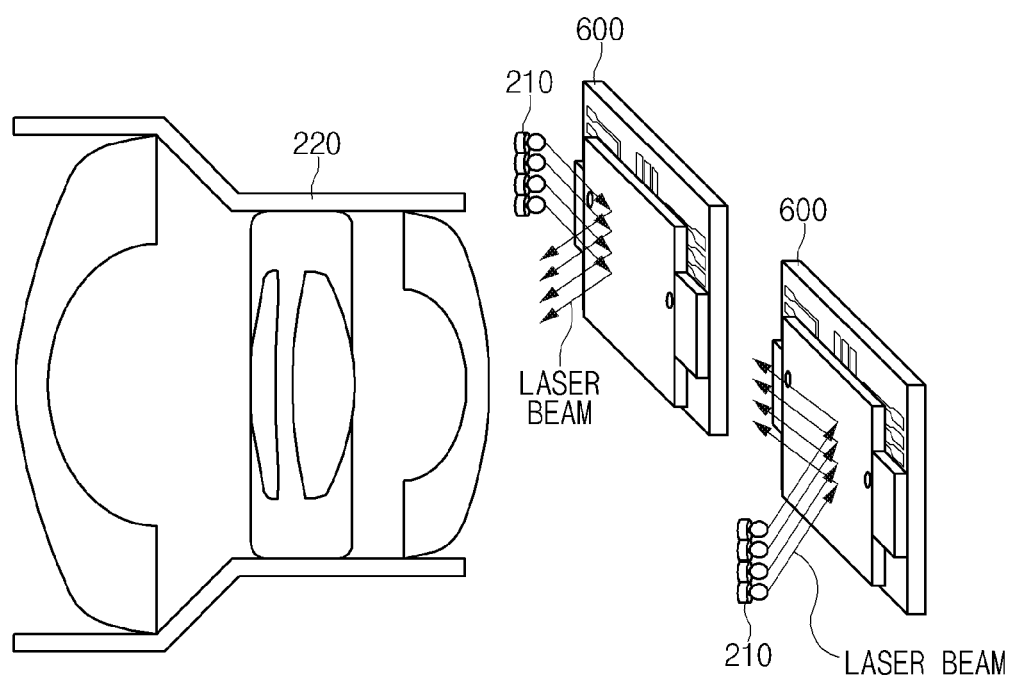

FIGS. 14 and 15 are views illustrating the optical scanner employing the optical deflector, according to another embodiment of the present disclosure.

When the optical deflector 600 illustrated in FIG. 12 is applied to the optical scanner 200, the light source array 210 is disposed facing the second substrate 120 of the optical deflector 600 as illustrated in FIG. 14. In addition, to widen the field of view of the optical scanner 200 and make the beam intensity uniform, at least two optical deflectors 600 and at least two light source arrays 210 may be employed as illustrated in FIG. 15.

Figure 16:
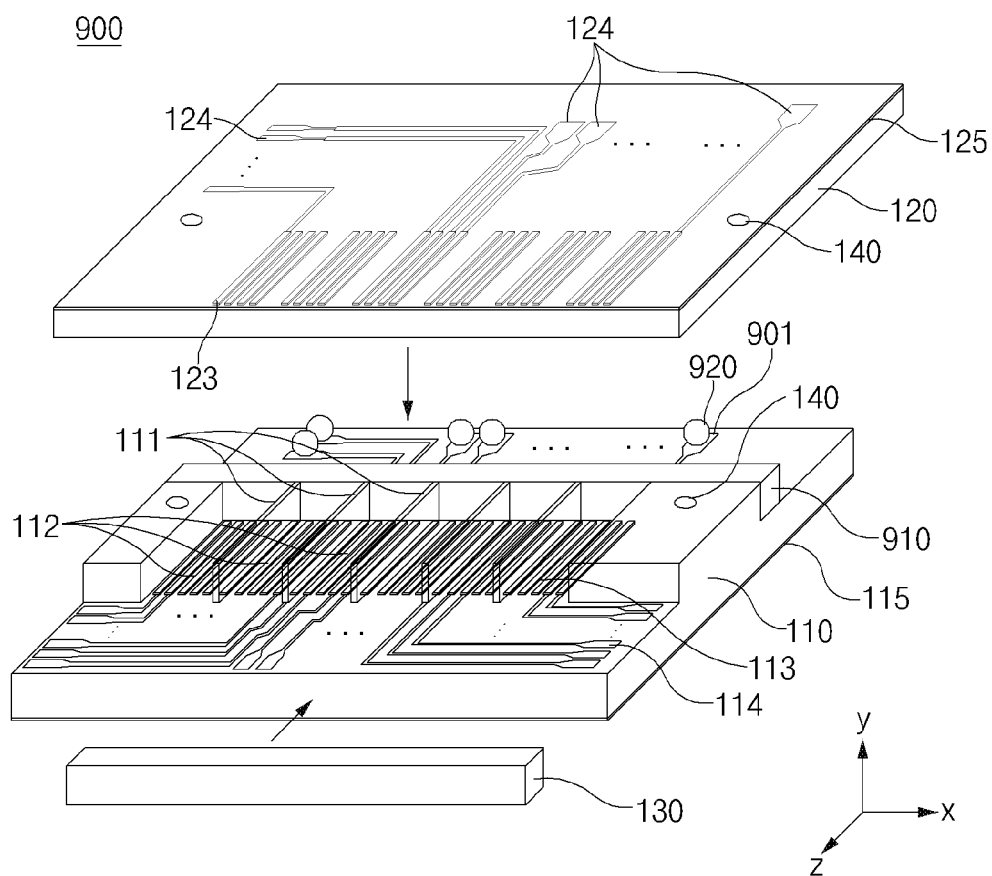
FIG. 16 is a view illustrating the optical deflector, according to another embodiment of the present disclosure.
Figure 17:
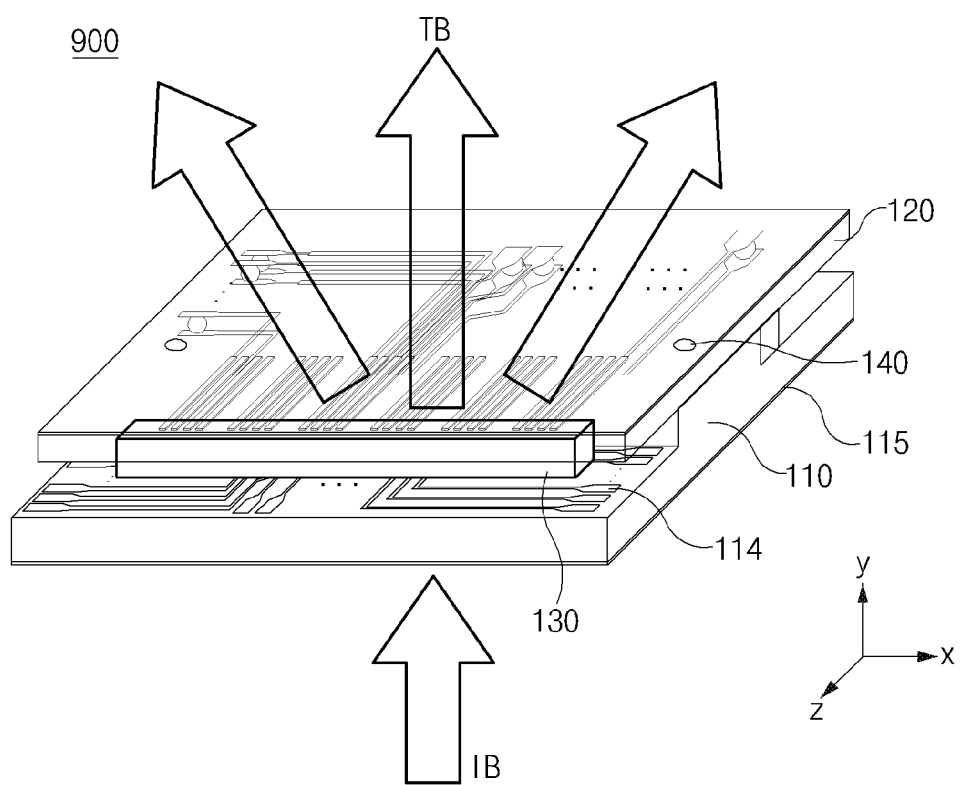
FIG. 17 is a view illustrating the operation of the optical deflector illustrated in FIG. 16.

FIG. 16 is a view illustrating an optical deflector 900, according to another embodiment of the present disclosure, and FIG. 17 is a view illustrating the operation of the optical deflector 900 illustrated in FIG. 16. In the following description of the present embodiment, the duplication description of the same component as that of the optical deflector 100 illustrated in FIG. 1 will be omitted. The present embodiment suggests a scheme to reduce the number of the external connectors of the optical deflector since the same voltage is applied to the symmetrical electrode pair of the first substrate 110 and the second substrate 120 positioned opposite by having electrical connection between the pair.

Referring to FIG. 16, to form the liquid crystal cells 112 on the first substrate 110, partition walls 111 that partition the liquid crystal cells 112 are formed on the first substrate 110 at regular spacing. The first electrode array 113 is formed on the bottom surface of each of the liquid crystal cells 112, that is, on the first substrate 110, and the second electrode array 123 is formed in a symmetrical position to the first electrode array 113 on the top surface of the liquid crystal cells 112, that is, on the second substrate 120. In this case, a connector 901 extends from the first electrode array 113 to connect the first electrode array 113 on the first substrate 110 to the second electrode array 123 on the second substrate 120. A contact terminal 920 may be formed on the connector 901 to be electrically connected to the second external connectors 124 of the second substrate 120.

Thereafter, a blocking wall 910 is formed on the opposite side of the liquid crystal injection hole of the liquid crystal cell 112. The blocking wall 910 includes a non-conductive material and has the same height as the height of the partition walls 111. The blocking wall 910 may be formed through a selective thin film deposition process and an etching process.

According to the present disclosure, the steering angle of the beam can be adjusted by using the electro-optical properties of the liquid crystal, so that beam scanning can be performed by electrical control without mechanical driving.

Further, according to the present disclosure, two or more optical deflectors are applied to compensate for light loss due to electro-optical driving of the optical deflector and to enable uniform light output Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An optical deflector, comprising:
 a first substrate and a second substrate disposed facing each other;
 a plurality of liquid crystal cells formed between the first substrate and the second substrate and partitioned by partition walls;
 a first partition wall electrode and a second partition wall electrode formed on inner partition wall surfaces, respectively, in each of the liquid crystal cells;
 a first electrode array having a plurality of electrodes regularly arranged on the first substrate inside each of the liquid crystal cells;
 a second electrode array disposed on the second substrate in each of the liquid crystal cells to be symmetrical to the first electrode array;
 a first external connector array formed on the first substrate to connect the first partition wall electrode, the second partition wall electrode, and the first electrode array to an outside; and
 a second external connector array formed on the second substrate to connect the second electrode array to the outside.

2. The optical deflector of claim 1, wherein antireflective coating layers are formed on outer surfaces of the first substrate and the second substrate, respectively.

3. The optical deflector of claim 1, wherein an antireflective coating layer is formed on one of outer surfaces of the first substrate and the second substrate, and a reflective coating layer is formed on a remaining one of the outer surfaces of the first substrate and the second substrate.

4. An optical scanner, comprising:
 a light source array configured to generate a laser beam;
 an optical deflector including a plurality of liquid crystal cells, which transmit the laser beam, the optical deflector configured to deflect a transmission path of the laser beam depending on a voltage applied to the plurality of liquid crystal cells;
 an optics assembly configured to scan the laser beam deflected by the optical defector in a horizontal direction; and
 a controller configured to adjust the voltage applied to the plurality of liquid crystal cells,
 wherein each of the liquid cystal cells includes:
  a first partition wall electrode and a second partition wall electrode formed on partition wall surfaces which partition each if the liquid crystal cells;
  a first electrode array including electrodes formed on a first substrate and arranged with a predetermined spacing; and
  a second electrode array formed on a second substrate to be symmetrical to the first electrode array.

5. The optical scanner of claim 4, wherein the light source array includes a plurality of laser light sources arranged in a vertical direction.

6. The optical scanner of claim 5, wherein the light source array emits a beam collimated through a collimating lens.

7. The optical scanner of claim 4, wherein the controller is configured to:
 apply gradually increasing voltages to the electrodes of the first electrode array in each of the liquid crystal cells; and
 apply the same gradually increasing voltages identical to the voltages applied to the electrodes of the first electrode array to electrodes of the second electrode array, which are symmetrical to the electrodes of the first electrode array.

8. The optical scanner of claim 7, wherein the controller is configured to:
 apply a preset minimum voltage to one of the first partition wall electrode and the second partition wall electrode; and
 apply a preset maximum voltage to a remaining one of the first partition wall electrode and the second partition wall electrode.

9. The optical scanner of claim 8, wherein the controller is configured to:
 adjust a steering angle of a laser beam incident onto the optical deflector by adjusting the maximum voltage.

10. The optical scanner of claim 4, further comprising:
 multiple light source arrays and multiple optical deflectors.

11. The optical scanner of claim 4, wherein the optical deflector is interposed between the light source array and the optics assembly, when the optical deflector is in a transmission type.

12. The optical scanner of claim 4, wherein the light source array and the optics assembly are positioned at one side of the optical deflector when the optical deflector is a reflective type.

* * * * *